(12) United States Patent
Benz et al.

(10) Patent No.: US 9,616,539 B2
(45) Date of Patent: Apr. 11, 2017

(54) MACHINE TOOL

(71) Applicant: Licon mt GmbH & Co. KG, Laupheim (DE)

(72) Inventors: Winfried Benz, Dietenheim (DE); Frank Gessner, Laupheim (DE); Thomas Weinbuch, Laupheim (DE); Gerald Stengele, Ulm (DE)

(73) Assignee: LICON MT GMBH & CO. KG, Laupheim (DE)

( * ) Notice: Subject to any disclaimer, the term of this patent is extended or adjusted under 35 U.S.C. 154(b) by 0 days.

(21) Appl. No.: 14/889,547

(22) PCT Filed: May 7, 2014

(86) PCT No.: PCT/EP2014/059333
§ 371 (c)(1),
(2) Date: Nov. 6, 2015

(87) PCT Pub. No.: WO2014/180903
PCT Pub. Date: Nov. 13, 2014

(65) Prior Publication Data
US 2016/0082559 A1    Mar. 24, 2016

(30) Foreign Application Priority Data

May 8, 2013 (DE) .......... 10 2013 208 440
Aug. 23, 2013 (DE) .......... 10 2013 216 752

(51) Int. Cl.
| | | |
|---|---|---|
| *B23Q 7/14* | (2006.01) | |
| *B23Q 1/48* | (2006.01) | |
| *B23Q 11/08* | (2006.01) | |
| *B23Q 1/25* | (2006.01) | |
| *B23Q 39/00* | (2006.01) | |

(52) U.S. Cl.
CPC .......... *B23Q 7/1431* (2013.01); *B23Q 1/25* (2013.01); *B23Q 1/4876* (2013.01); *B23Q 11/08* (2013.01);
(Continued)

(58) Field of Classification Search
CPC .......... B65G 2201/0267; B23Q 1/66; B23Q 7/1431; B23Q 11/08; B23Q 2039/002;
(Continued)

(56) References Cited

U.S. PATENT DOCUMENTS 7,226,403 B2 * 6/2007 Konvicka .......... B23Q 1/012
198/346.1
7,627,937 B2   12/2009 Jung
(Continued)

FOREIGN PATENT DOCUMENTS

DE     GB 2271945 A * 5/1994 .......... B23Q 1/48
DE     202007014117 U1  12/2007
(Continued)

*Primary Examiner* — Sunil K Singh
*Assistant Examiner* — Michael Vitale
(74) *Attorney, Agent, or Firm* — Browdy and Neimark, PLLC

(57) ABSTRACT

A machine tool comprises a tool spindle which can be positioned in 3 axes and a pivot bridge pivotable about an A axis with a round table for mounting a workpiece pallet supporting a workpiece. Furthermore, in front of the pivot bridge, a mount is provided for a processed workpiece or workpiece to be processed located on a workpiece pallet. Between the mount and the pivot bridge a pallet changer is provided which can only perform a vertical displacement movement and a pivot movement about a vertical axis. Workpiece pallets are picked up and put down only during the vertical displacement movement of the pallet changer, or possibly by pivoting the pivot bridge about the A axis.

16 Claims, 7 Drawing Sheets

(52) U.S. Cl.
CPC ............. *B23Q 2039/006* (2013.01); *B65G 2201/0267* (2013.01); *Y10T 29/5196* (2015.01); *Y10T 409/30392* (2015.01); *Y10T 409/30532* (2015.01); *Y10T 409/30896* (2015.01); *Y10T 409/305656* (2015.01); *Y10T 409/305824* (2015.01); *Y10T 409/307168* (2015.01)

(58) Field of Classification Search
CPC . B23Q 2039/006; B23C 1/14; Y10T 29/5124; Y10T 29/5196; Y10T 409/30392; Y10T 409/30532; Y10T 409/305432; Y10T 409/305656; Y10T 409/305824; Y10T 409/306048; Y10T 409/306104; Y10T 409/30896
USPC ....... 409/134, 159, 161, 165, 168, 172, 173, 409/224; 198/345.3, 346.1; 29/33 P, 563
See application file for complete search history.

(56) References Cited

U.S. PATENT DOCUMENTS

| | | |
|---|---|---|
| 8,640,313 B2 | 2/2014 | Horn et al. |
| 8,978,218 B2 | 3/2015 | Moder et al. |
| 2004/0107556 A1 | 6/2004 | Yasuda et al. |
| 2007/0022591 A1* | 2/2007 | Bernhard ............... B23Q 1/012 29/33 P |
| 2007/0289115 A1* | 12/2007 | Kawai ................. B23Q 1/4852 29/33 P |
| 2011/0052341 A1* | 3/2011 | Horn ................... B23Q 7/1431 409/159 |

FOREIGN PATENT DOCUMENTS

| | | |
|---|---|---|
| DE | 102008014781 A1 | 9/2009 |
| EP | 2623256 A2 | 8/2013 |

* cited by examiner

MACHINE TOOL

CROSS-REFERENCES TO RELATED APPLICATIONS

This application claims the priority of German Patent Application, Serial No. 10 2013 208 440.4, filed May 8, 2013, and German Patent Application, Serial No. 10 2013 216 752.0, filed Aug. 23, 2013, pursuant to 35 U.S.C. 119(a)-(d), the content of which is incorporated herein by reference in its entirety as if fully set forth herein.

FIELD

The invention relates to a machine tool for 5-axis processing of workpieces comprising
a machine frame having a horizontal machine bed and a vertical stand, processing chamber formed on the machine frame, at least one rotary-driven tool spindle which is mounted in the stand and movable in the processing chamber in axes that are perpendicular to one another, namely an X axis and a Y axis, a pivot bridge mounted in the processing chamber which pivot bridge is drivable pivotably about an A axis parallel to the X axis, at least one round table arranged on the pivot bridge for releasably mounting a workpiece pallet, which round table is pivotable about a B axis perpendicular to the A axis, a loading and unloading chamber formed in front of the processing chamber, at least one pallet changer arranged in the loading and unloading chamber, wherein the pallet changer is displaceable only in vertical direction and is drivable pivotably about a vertical axis, wherein the pallet changer comprises first and second holding means for releasably mounting at least two workpiece pallets, wherein the pallet changer is movable from a lower loading and unloading position with a second workpiece pallet mounted in a second holding means in vertical direction via at least one middle position forming a connection between a first holding means and a first workpiece pallet located on a round table of the pivot bridge, wherein the pallet changer is movable from the middle position into an upper position, in which the first workpiece pallet connected to the first holding means is lifted upwards from the round table of the pivot bridge, wherein the pallet changer is rotatable in the upper position about the vertical axis by pivoting out the first workpiece pallet lifted from the pivot bridge into the loading and unloading chamber and by pivoting in the second workpiece pallet from the loading and unloading chamber into the processing chamber, and wherein the pallet changer is lowerable via the middle position back into the lower position.

BACKGROUND

The aforementioned machine tool for five-axis processing workpieces is known from U.S. Pat. No. 8,640,313 B2. In this workpiece, a Z axis is formed by the pivot bridge being formed on a tool carriage which is movable in the Z direction. The pallet changer comprises two pairs of arms serving for receiving the tool pallets. During the processing of the workpiece the pallet changer is moved in a lower position in which the arms facing the workpiece slide are received underneath the pivot bridge, so that the workpiece slide is freely movable in the Z direction. Due to this embodiment it is true that the loading and unloading position of the pallet changer is underneath the pivot bridge but above the lower area of the workpiece slide. During the loading and unloading process numerous movements in particular of the workpiece slide are required. Furthermore, there is considerable required space.

In a machine tool known from EP 2 623 256 A2 the removal of the processed workpieces and the insertion of workpieces to be processed into the loading and unloading chamber is performed during the processing of workpieces in the processing chamber. This is referred to in the field as concurrent loading.

In generic machine tools pallet changers are provided which have two linear directions of displacement and are pivotable about a vertical axis in order to avoid collisions between the pallet changer and the pivot bridge.

SUMMARY OF THE INVENTION

An underlying objective of the invention is to design a pallet changer that is simple, takes up a small amount of space and has a shortened changing process.

Said objective is achieved according to the invention by in which at least one workholder is provided, which workholder is arranged in the loading and unloading chamber underneath the pivot bridge for releasably mounting a workpiece pallet, in which the tool spindle mounted in the stand is movable in a Z axis which is perpendicular to the X axis and the Y axis, and in which the pivot bridge is supported on the machine bed. It is essential that the pallet changer can only perform a linear movement and a rotational movement and only needs to perform the latter movements. The supply of the workpieces to be processed clamped onto the workpiece pallets is performed linearly from the below and with a rotation of 180° about a vertical axis, wherein at the said time as the linear vertical upwards movement the processed workpieces along with the pallets supporting them can be lifted off the pivot bridge. After the pivot movement of the pallet changer about 180° and during the subsequent upwards movement the workpiece pallets with the workpieces to be processed are placed down on the pivot bridge and the workpiece pallets with the processed workpieces are placed down on the work holder in the loading and unloading chamber. As only a linear displacement is possible in vertical direction and a rotational movement about a vertical axis, the whole structure is very simple and thus inexpensive. Since the pallet changer is arranged very closely in front of and below the pivot bridge a very compact structure is obtained. As only two movements are necessary the changing process is shortened. One or more tables can be provided on the pivot bridge and accordingly the same number of work holders in the loading and unloading chamber. Furthermore, the same number of tool spindles can also be provided; however, it is also possible for the number of tool spindles to be lower, especially during the sequential processing of workpieces.

If the pallet changer with workpieces to be processed approaches the pivot bridge from below, this area may become contaminated with shavings. Therefore it is advantageous that between the processing chamber and the loading and unloading chamber a dividing wall is arranged which is openable.

Depending on the structure of the pivot bridge and possibly the mounting tables it is possible that during a linear vertical insertion of the holding means of the pallet changer below the workpiece pallets there may be a collision between the pivot bridge and the holding means of the pallet changer. In such cases it is particularly advantageous if the pivot bridge is pivotable into the vertical displacement path and out of the vertical displacement path of the pallet changer with workpiece pallet. In this case the generic pivotability of the pivot bridge about the A axis is used to replace the horizontal movement of the pallet changer, which is unnecessary according to the invention but is necessary in the prior art.

The measures according to the invention are particularly advantageous in an embodiment, in which space is saved in particular as only one pallet changer is provided in a machine tool with two tool spindles.

Further advantages and details of the invention are given in the following description of an embodiment with reference to the drawing.

DESCRIPTION

Figure 1:
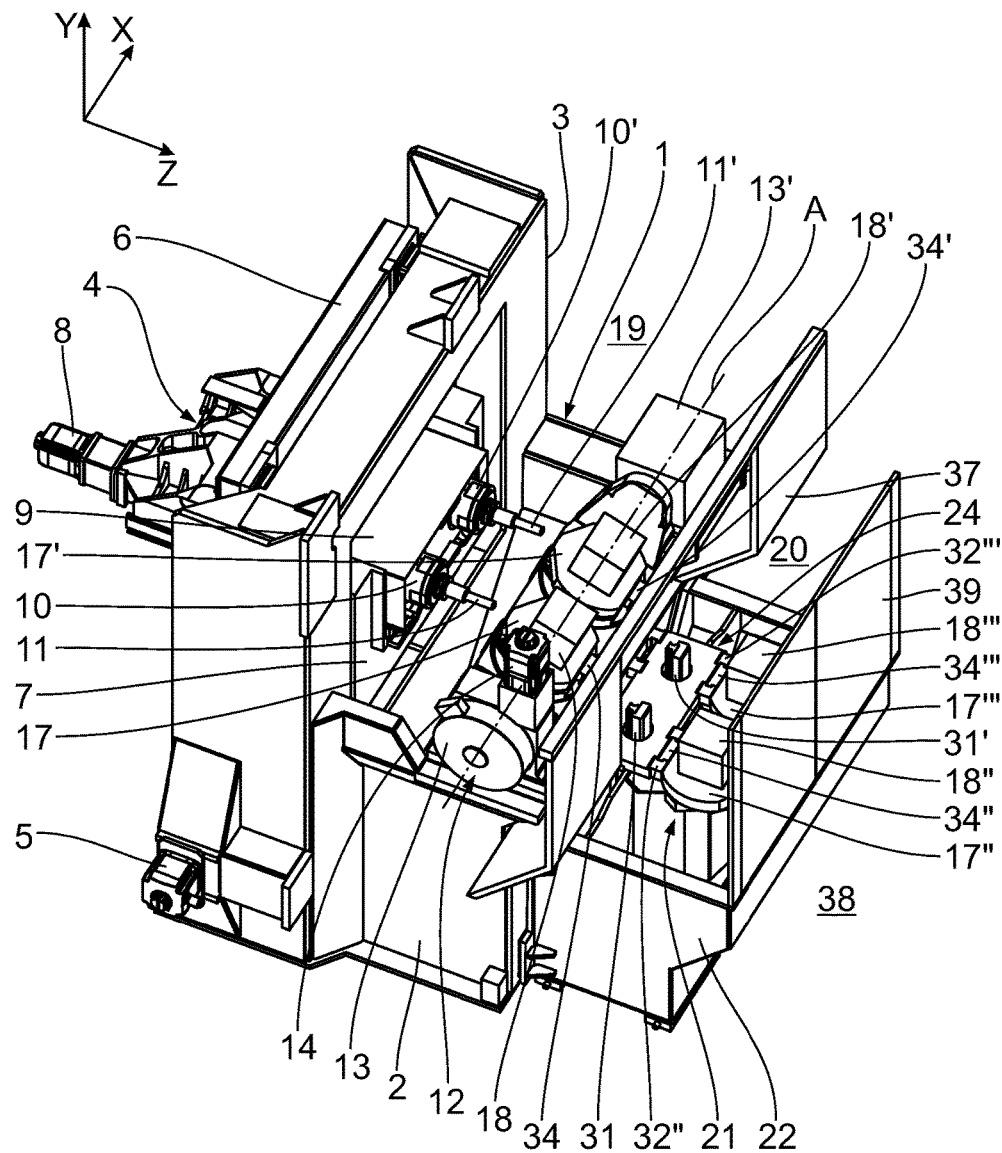
FIG. 1 is a perspective view of a machine tool according to the invention.
Figure 2:
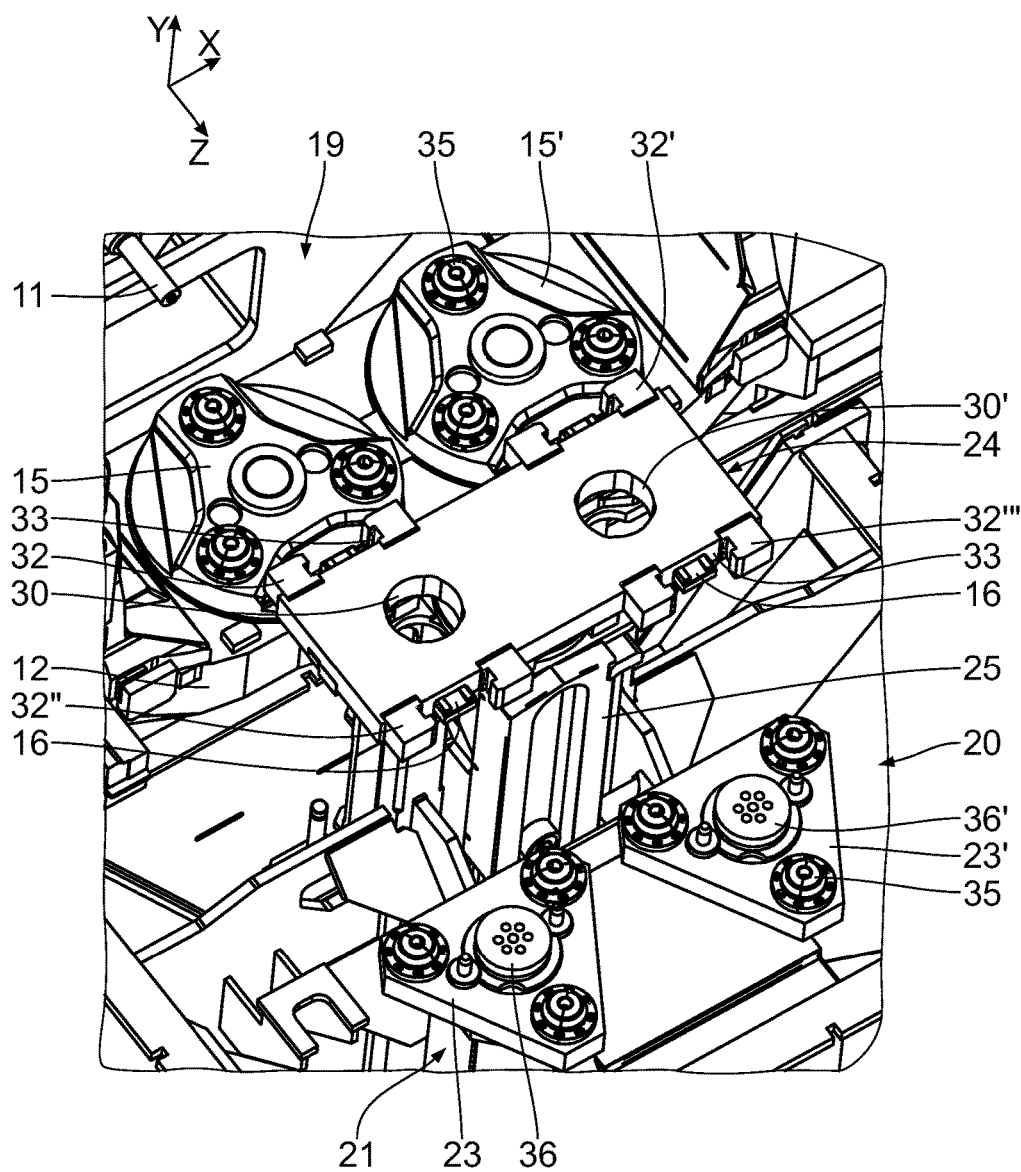
FIG. 2 is a perspective part view of the machine tool enlarged relative to FIG. 1, in which workpiece pallets with clamped on workpieces have been omitted.

As shown in particular in FIGS. 1 and 2 a machine tool according to the invention has an approximately angled machine frame 1 which is formed essentially by a horizontal machine bed 2 and a vertical stand 3. In the frame-like stand 3 a drive unit 4 is arranged which has an X slide 6 which can be moved in horizontal X direction by means of an X drive 5. On the X slide 6 a Y slide 7 is mounted which can be moved by means of a not shown Y drive in vertical Y direction. On the Y slide 7 a Z slide 9 is mounted which can be moved by means of a Z drive 8 in horizontal Z direction, in which by means of a not shown spindle drive rotary driven tool spindles 10 or 10' are attached. The tool spindles 10, 10' are used for mounting a processing tool 11, 11' respectively.

On the machine bed 2 a pivot bridge 12 is supported which at its ends is mounted pivotably in pivot bearings 13, 13' about an A axis parallel to the X direction and can be driven pivotably by means of a pivot drive 14.

On the pivot bridge 12 two mounting tables designed in the form of round tables 15, 15' are arranged, which are each assigned to a tool spindle 10, 10'. Said round tables 15, 15' can be rotary driven respectively by means of a not shown rotary drive about a B axis perpendicular to the A axis. The round tables 15, 15' are used for mounting workpiece pallets 17, 17', on which a respective workpiece 18, 18' or 18'', 18''' to be processed is clamped. The chamber above the machine bed 2 and in front of the stand 3 is a processing chamber 19 of the machine tool.

Figure 3:
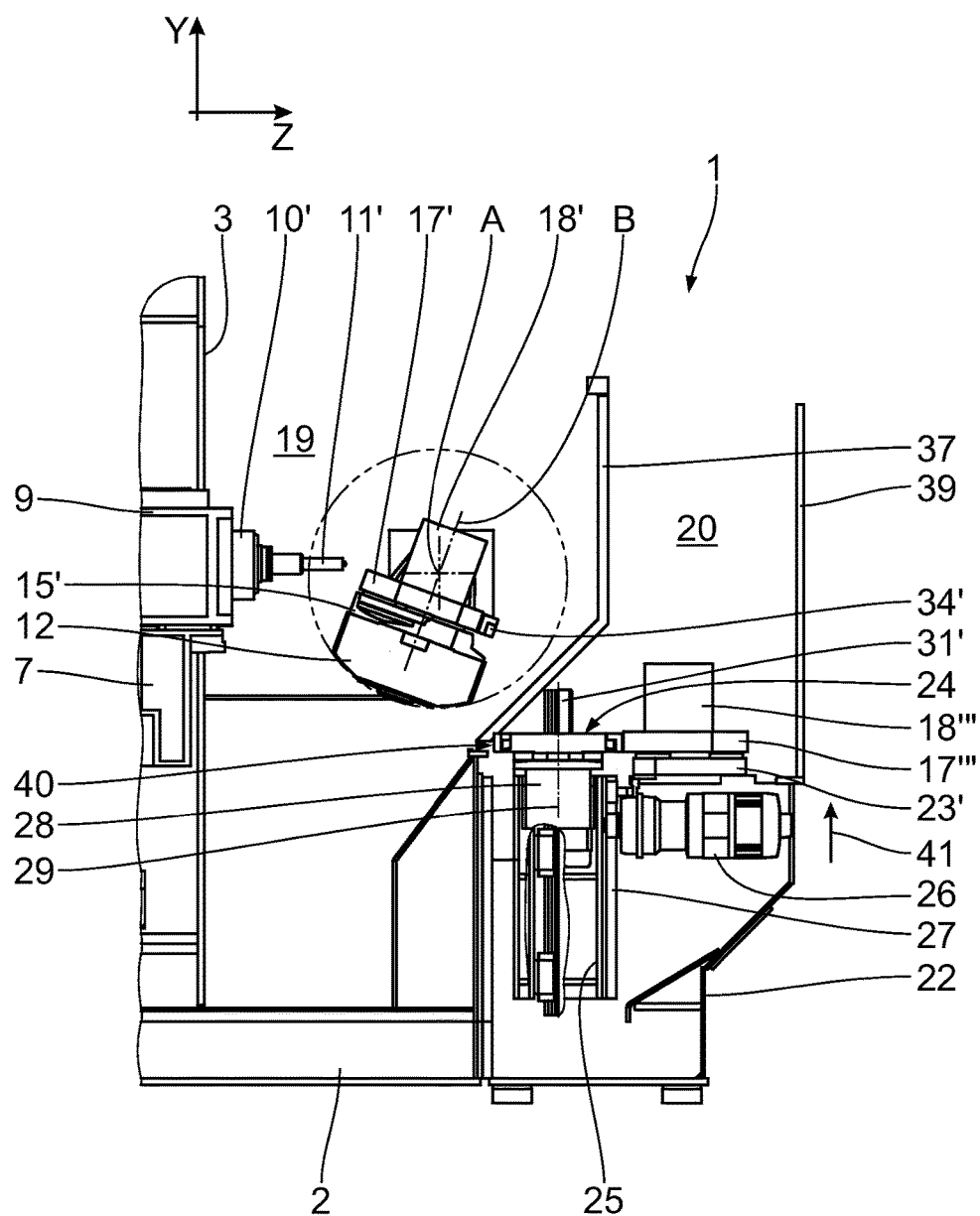
FIG. 3 is a vertical longitudinal cross section of the machine tool in a very schematic view, in which the pallet changer is located in a lower position prior to beginning a pallet change.

In Z direction in front of and below the processing chamber 19 a loading and unloading chamber 20 is formed with a pallet changing unit 21, in which two work holders 23, 23' for two workpiece pallets 17'', 17''' are arranged on a pallet changer frame 22. Between said work holders 23, 23' and the pivot bridge 12 the actual pallet changer 24 is arranged, which—as shown in FIGS. 2 and 3—is arranged on a vertically displaceable pallet changer slide 25. The vertical drive of the pallet changer slide 25 is performed by means of a slide drive 26 via a pinion rack drive 27. The pallet changer 24 designed essentially as a plate is pivotable by 180° by means of a pallet pivot drive 28 attached to the slide 25 about a vertical pallet changer pivot axis 29.

As shown in particular in FIGS. 1, 2 and 3, but also the other Figures, the pallet changer 24 comprises guide openings 30, 30', in which vertical guide rods 31, 31' attached to the pallet changer frame 22 engage in lower positions of the pallet changer 24, whereby the pallet changer 24 in its lower positions achieves a precisely aligned and stabilised position.

On two longitudinal edges of the pallet changer 24 holding means 32, 32', 32'', 32''' assigned respectively to the round tables 15, 15' or the work holders 23, 23' are formed, which have holding openings 33 that are open at the top, which are delimited at the bottom by supports 16. On each workpiece pallet 17, 17', 17'', 17''' a counterpiece 34, 34', 34'', 34''' is attached which is adapted to the holding opening 33 in the respective holding means 32, 32', 32'', 32''' such that it is held in a form-fitting manner in the respective holding means 32, 32', 32'', 32''' on the associated support 16, when the pallet changer 24 is started up and in this way the respective holding means 32, 32', 32'', 32''' mounts or holds a counterpiece 34, 34', 34'', 34'''.

As can be taken in particular from FIG. 2, on the round tables 15, 15' and on the work holders 23, 23' of the pallet changing unit 21 known clamping elements 35 are formed, by means of which the tool pallets 17, 17', 17'', 17''' can be held in precise alignment. It is also shown in FIG. 2 that on the work holders 23, 23' media couplings 36, 36' are provided, i.e. hydraulic connections, by means of which not shown, known, workpiece clamping devices formed on the workpiece pallets 17, 17', 17'', 17''' are opened or closed, by means of which workpieces 18, 18' or 18'', 18''' in the loading and unloading chamber 20 are clamped onto a workpiece pallet 17, 17' or 17'', 17''' or released from the latter.

As shown in FIG. 1, between the processing chamber 19 and the loading and unloading chamber 20 a dividing wall 37 is provided as a protective wall, by means of which during the processing in the processing chamber 19 it is possible to prevent the escape of shavings, oil and the like into the loading and unloading chamber 20. It is only opened for pallet changing. On the side of the loading and unloading chamber 20 facing the operator 38 a protective door 39 can also be provided which is only opened for removing processed workpieces 18, 18', 18'', 18''' and for fitting with workpieces 18, 18', 18'', 18''' to be processed.

The working process of the pallet changer 24 is as follows:

In the processing chamber 19 there are two workpieces 18, 18' clamped onto workpiece pallets 17, 17' on the round tables 15, 15'. They are subjected to a 5-axis processing by the tools 11, 11', wherein the tool spindles 10, 10' supporting the tools 11, 11' are supplied in X, Y and Z direction. The workpieces 18, 18' are moved by pivoting about the A axis of the pivot bridge 12 and by rotating about the B axis of the round tables 15, 15'. Simultaneously, with an open door 39 in the loading and unloading chamber 20 already processed workpieces are removed and workpieces 18", 18''' to be processed are clamped onto workpiece pallets 17", 17''' located on the work holders 23, 23' and held by the pallet changer 24.

After completing the processing of the workpieces 18, 18' the pallet changing begins, and for this the dividing wall 37 is moved into the opened position shown FIG. 1. The pallet changer 24 is located in the lower loading and unloading position 40 shown in FIGS. 1 and 3, in which the holding means 32", 32''' mount the counterpieces 34", 34''' of the two workpiece pallets 17", 17''' located on the work holders 23, 23' in a form-fitting manner.

Figure 4:
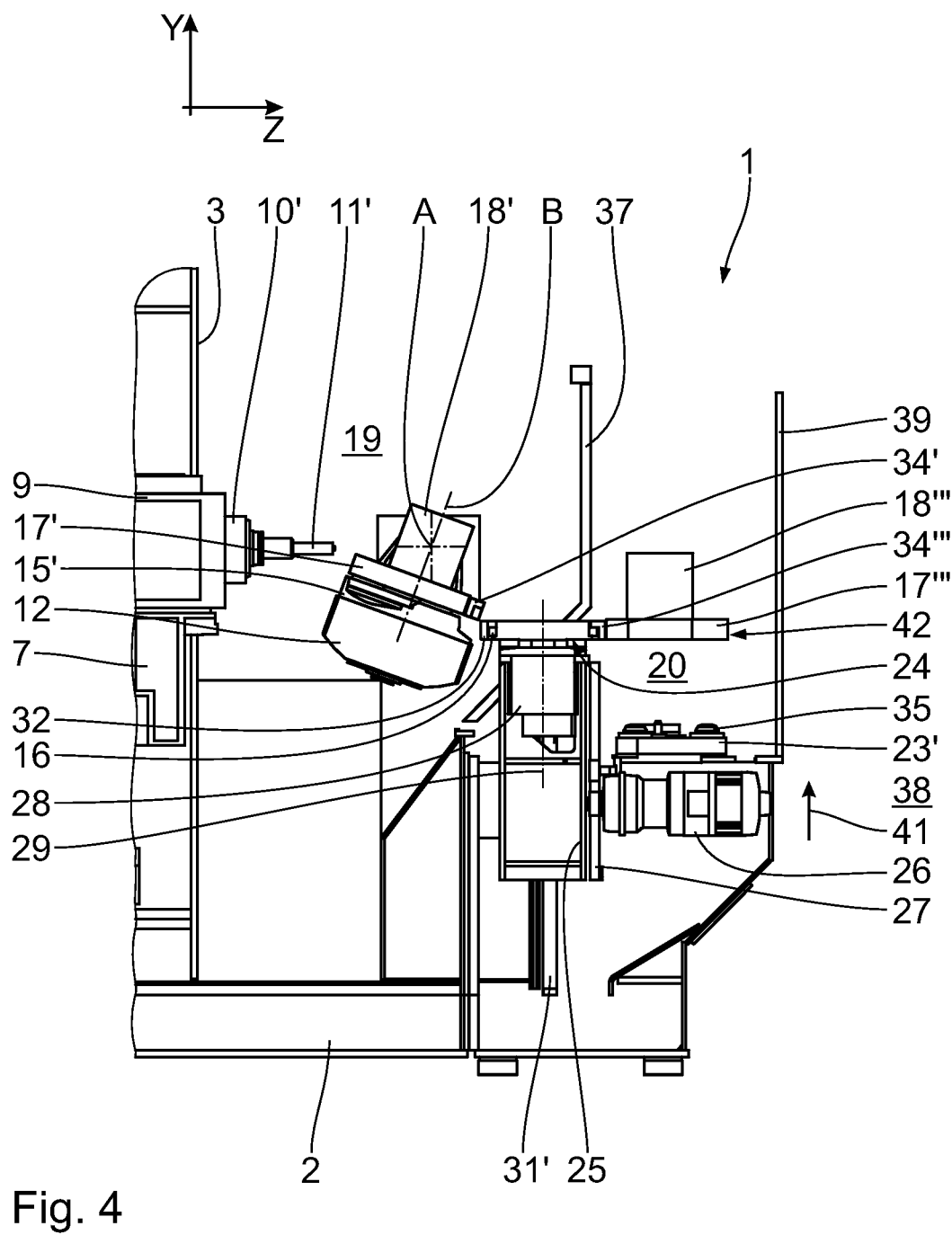
FIG. 4 is a view according to FIG. 3, in which the pallet changer is located in an already vertically raised first middle position.
Figure 5:
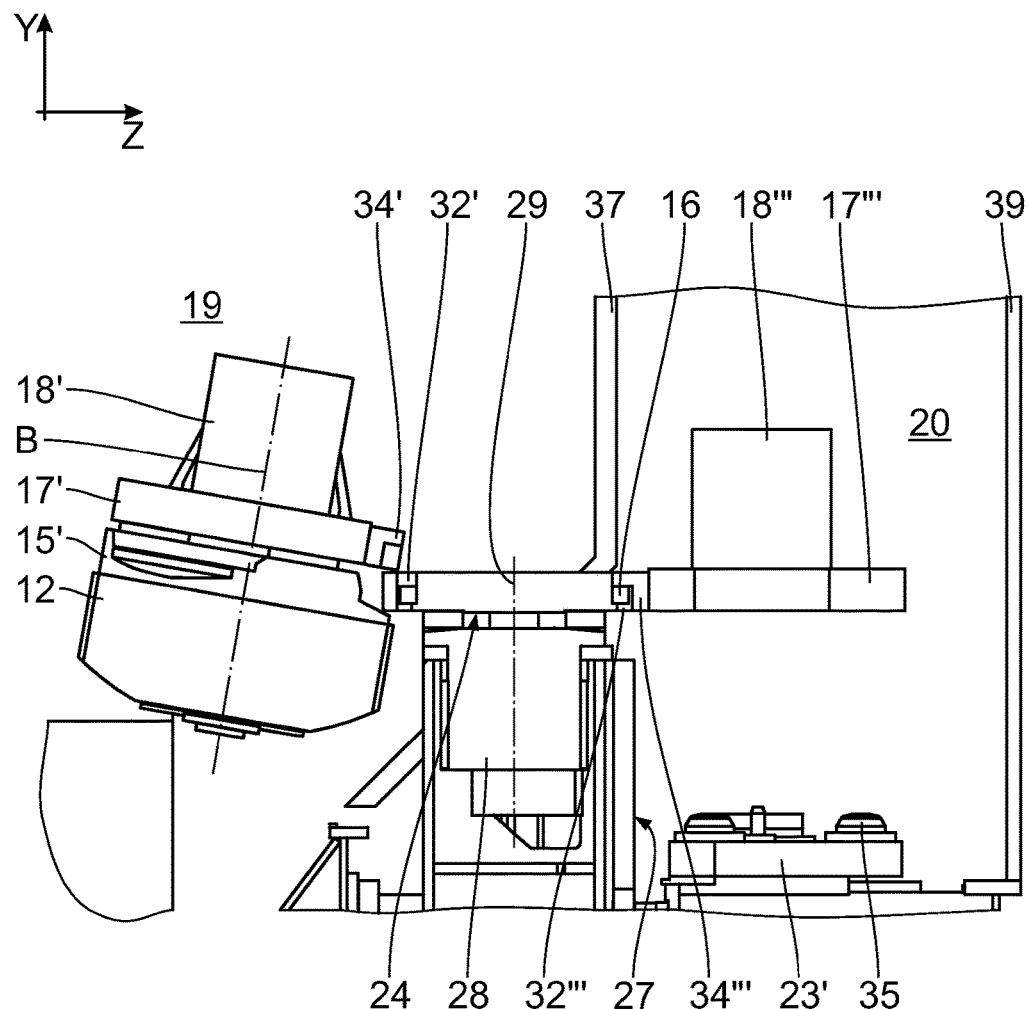
FIG. 5 is a view corresponding essentially to FIGS. 3 and 4, in which the pallet changer is located in a position that is raised slightly further than FIG. 4.
Figure 6:
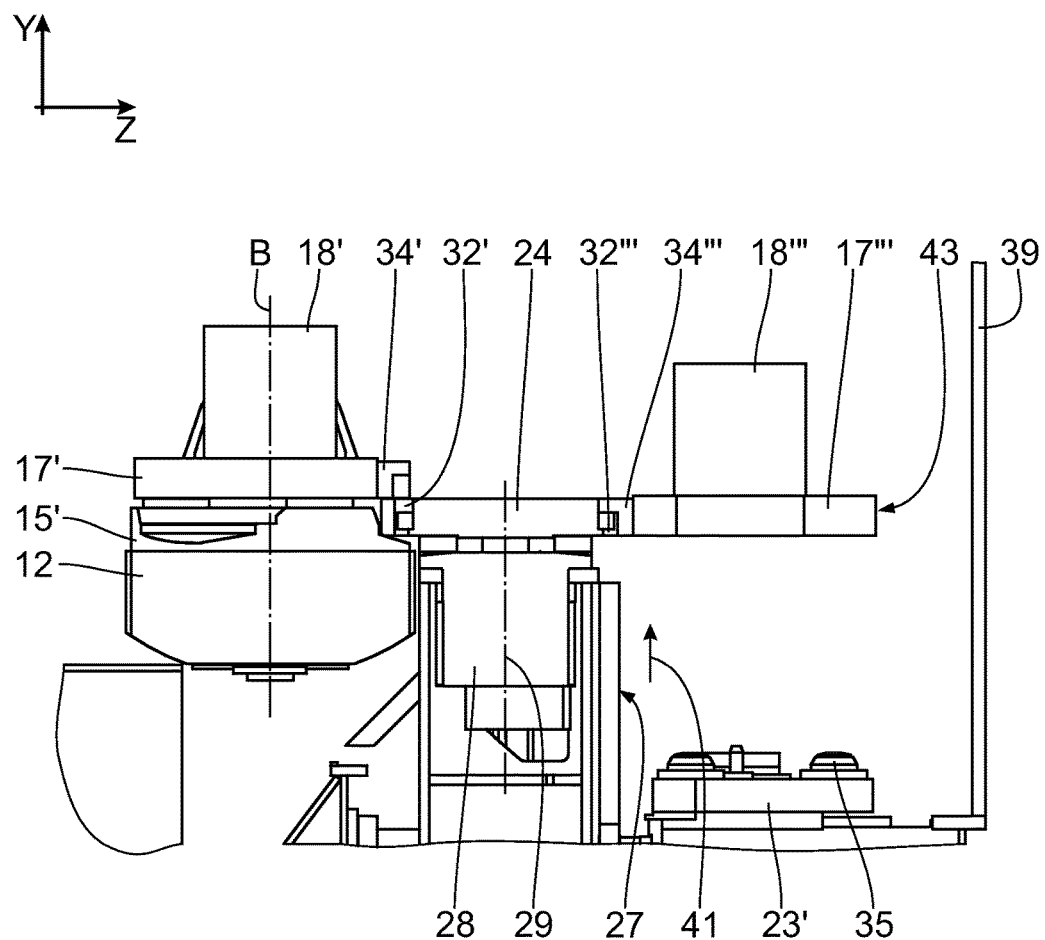
FIG. 6 is a view corresponding to FIGS. 3 to 5, in which the pallet changer is located in a second middle position that is slightly raised relative to FIG. 5.

The pallet changer 24 is then displaced upwards by the slide drive 26 in vertical displacement direction 41 into a first middle position 42. In said first middle position 42 the pivot bridge 12 is pivoted about its A axis such that the holding means 32, 32' of the pallet changer 24 facing the pivot bridge 12 does not collide with the pivot bridge 12. In this first middle position 42 the holding means 32, 32' facing the pivot bridge 12 are still below the counterpieces 34, 34' of the workpiece pallets 17, 17' located on the round tables 15, 15', as can be seen in FIG. 4 and in enlarged form in FIG. 5. Then, as shown in FIG. 6, the pivot bridge 12 is pivoted about the A axis such that the respective B axis of the round tables 15, 15' is vertical, i.e. parallel to the displacement direction 41 of the pallet changer 24. The pallet changer 24 is located according to FIG. 6 in a second middle position 43, in which the holding means 32, 32' are located immediately underneath the counterpieces 34, 34' of the two workpiece pallets 17, 17' located on the round tables 15, 15'.

Figure 7:
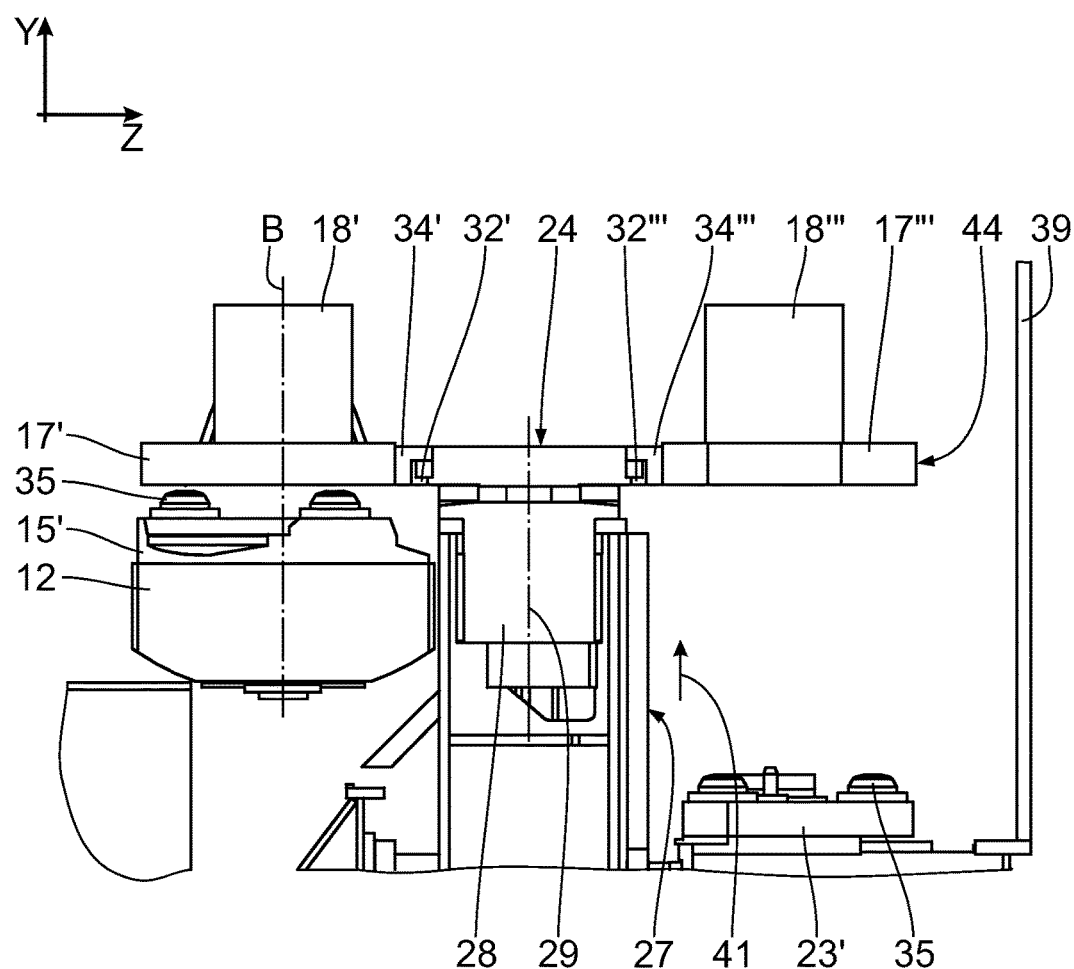
FIG. 7 is a representation corresponding to FIGS. 3 to 6, in which the pallet changer is located in its upper position, in which workpiece pallets with processed workpieces are lifted from the pivot bridge.

The pallet changer 24 is displaced further without rotation about the axis 29 upwards into an upper position 44, which is shown in FIG. 7. In this case, the holding means 32, 32' of the pallet changer 24 have already mounted the counterpieces 34, 34' of the workpiece pallets 17, 17' located on the round tables 15, 15' with finally processed workpieces 18, 18' and the workpiece pallets 17, 17' are lifted off the round tables 15, 15'. In this upper position 44 a 180° rotation of the pallet changer 24 is performed about the pallet changer pivot axis 29, so that the processed workpieces 18, 18' are pivoted into the loading and unloading chamber 20 and at the same time the unprocessed workpieces 18", 18''' are pivoted into the processing chamber 19. The pallet changer 24 is lowered in a reverse sequence to the upwards movement.

If the pivot bridge 12 in a vertical position of the B axis is not in the collision zone of the pallet changer 24 during its upwards or downwards movement, the pallet changer 24 can then be moved directly out of the lower position 40 into the second middle position 43. In principle, stopping the pallet changer 24 in the first middle position 42 and the second middle position 43 is not absolutely necessary, if the control allows this.

Said control of the numerous drives including the clamping elements 35 and the mentioned clamping devices is performed by means of a central programmable control which is not shown.

The invention claimed is:

1. A machine tool for 5-axis processing of workpieces, the machine tool comprising:
   a machine frame having a horizontal machine bed and a vertical stand,
   a processing chamber formed on the machine frame,
   at least one rotary-driven tool spindle which is mounted in the vertical stand, and is movable in the processing chamber in X, Y, and Z axes that are perpendicular to one another,
   a pivot bridge mounted in the processing chamber, wherein the pivot bridge is supported on the machine bed, and is pivotable about an A axis, which extends parallel to the X axis,
   at least one round table arranged on the pivot bridge for releasably mounting a first workpiece pallet, the at least one round table being rotatable about a B axis,
   a loading and unloading chamber, which is formed next to the processing chamber, and
   at least one pallet changer arranged in the loading and unloading chamber,
   wherein the at least one pallet changer is linearly displaceable only in a vertical direction, and is pivotable about a vertical axis,
   wherein the at least one pallet changer comprises first and second holding means for releasably mounting at least the first workpiece pallet and a second workpiece pallet,
   wherein the at least one pallet changer is movable in the vertical direction along a vertical displacement path from a first loading and unloading position with the second workpiece pallet mounted in the second holding means to a second position, thereby forming a connection between the first holding means and the first workpiece pallet, which is disposed upon the at least one round table of the pivot bridge,
   wherein the at least one pallet changer is movable in the vertical direction from the second position into a third position, in which the first workpiece pallet connected to the first holding means is lifted upwards from the at least one round table of the pivot bridge,
   wherein the at least one pallet changer in the third position is rotated about the vertical axis, thereby pivoting the first workpiece pallet lifted from the pivot bridge into the loading and unloading chamber and pivoting the second workpiece pallet from the loading and unloading chamber into the processing chamber,
   wherein the at least one pallet changer is lowerable via the second position back into the first position,
   wherein at least one work holder is provided, which work holder is arranged in the loading and unloading chamber underneath of the pivot bridge for releasably mounting a given one of the first and second workpiece pallets.

2. The machine tool according to claim 1, wherein a dividing wall which is openable is arranged between the processing chamber and the loading and unloading chamber.

3. The machine tool according to claim 1, wherein the pivot bridge is pivotable into and out of the vertical displacement path of the pallet changer.

4. The machine tool according to claim 1, wherein the first and second holding means are arranged on opposing longitudinal edges of the at least one pallet changer, and are assigned to the at least one round table and the at least one work holder, respectively.

5. The machine tool according to claim 1, wherein the at least one pallet changer is displaceable without an intermediate stop from the first position into the third position.

6. The machine tool according to claim 1, wherein the first loading and unloading position of the at least one pallet changer is provided next to and underneath of the pivot bridge.

7. The machine tool according to claim 1,
   wherein the first and second holding means each comprise a holding opening, wherein a counterpiece is formed on each of the first and second workpiece pallets, each of the counterpieces being adapted to fit in a respective one of the holding openings, and wherein each holding means mounts the respective counterpiece by forming a connection during a vertical upwards movement of the at least one pallet changer along the vertical displacement path.

8. The machine tool according to claim 1, wherein the loading and unloading chamber is designed to be closed to the outside by a protective door that opens.

9. The machine tool according to claim 1, comprising:

two rotary driven tool spindles which are movable in the processing chamber in the X, Y, and Z axes, two round tables arranged on the pivot bridge for releasably mounting respective first workpiece pallets, two work holders arranged in the loading and unloading chamber underneath of the pivot bridge for releasably mounting respective second workpiece pallets, and only one pallet changer is arranged in the loading and unloading chamber, wherein the one pallet changer comprises two first holding means for releasably mounting the two first workpiece pallets and two second holding means for releasably mounting the two second workpiece pallets, wherein the one pallet changer is movable in the vertical direction along the vertical displacement path from the first loading and unloading position with the two second workpiece pallets held in the two second holding means to the second position, thereby forming a connection between the two first holding means and the two first workpiece pallets, which are disposed upon the two round tables of the pivot bridge, wherein the one pallet changer is movable in the vertical direction from the second position into the third position, in which the two first workpiece pallets connected to the two first holding means are lifted up from the two round tables of the pivot bridge, wherein the one pallet changer in the third position is rotated about the vertical axis, thereby pivoting the two first workpiece pallets lifted from the pivot bridge into the loading and unloading chamber and pivoting the two second workpiece pallets from the loading and unloading chamber into the processing chamber.

10. The machine tool according to claim 9, wherein a dividing wall which is openable is arranged between the processing chamber and the loading and unloading chamber.

11. The machine tool according to claim 9, wherein the pivot bridge is pivotable into and out of the vertical displacement path of the one pallet changer.

12. The machine tool according to claim 9, wherein the two first holding means and the two second holding means are arranged on opposing longitudinal edges of the one pallet changer, and are assigned to the two round tables and the two work holders, respectively.

13. The machine tool according to claim 9, wherein the one pallet changer is displaceable without an intermediate stop from the first position into the third position.

14. The machine tool according to claim 9, wherein the first loading and unloading position of the one pallet changer is provided next to and underneath of the pivot bridge.

15. The machine tool according to claim 9, wherein the two first holding means and the two second holding means each comprise a holding opening, wherein a counterpiece is formed on each of the two first workpiece pallets and the two second workpiece pallets, each of the counterpieces being adapted to fit in a respective one of the holding openings, and wherein each holding means mounts the respective counterpiece by forming a connection during a vertical upwards movement of the one pallet changer along the vertical displacement path.

16. The machine tool according to claim 9, wherein the loading and unloading chamber is designed to be closed to the outside by a protective door that opens.

* * * * *

UNITED STATES PATENT AND TRADEMARK OFFICE
CERTIFICATE OF CORRECTION

PATENT NO. : 9,616,539 B2
APPLICATION NO. : 14/889547
DATED : April 11, 2017
INVENTOR(S) : Winfried Benz et al.

It is certified that error appears in the above-identified patent and that said Letters Patent is hereby corrected as shown below:

On the Title Page

Item (73), Delete the entire data at item "(73) Assignee", and insert as follows:
--Licon mt GmbH & Co. KG., Laupheim (DE)--

Signed and Sealed this
Twenty-first Day of August, 2018

Andrei Iancu
*Director of the United States Patent and Trademark Office*